(12) United States Patent
Balaun

(10) Patent No.: US 12,068,594 B2
(45) Date of Patent: Aug. 20, 2024

(54) ADJUSTABLE POWER SHELF SYSTEM

(71) Applicant: Walmart Apollo, LLC, Bentonville, AR (US)

(72) Inventor: David Balaun, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 206 days.

(21) Appl. No.: 17/736,018

(22) Filed: May 3, 2022

(65) Prior Publication Data

US 2022/0360066 A1 Nov. 10, 2022

Related U.S. Application Data

(60) Provisional application No. 63/184,073, filed on May 4, 2021.

(51) Int. Cl.
*H02G 5/04* (2006.01)
*A47F 5/00* (2006.01)
*A47F 5/10* (2006.01)
*G09F 3/20* (2006.01)

(52) U.S. Cl.
CPC ............. *H02G 5/04* (2013.01); *A47F 5/0068* (2013.01); *A47F 5/10* (2013.01); *G09F 3/208* (2013.01)

(58) Field of Classification Search
CPC ............. A47B 21/00; A47B 2200/008; A47B 2200/0082; A47B 2200/0083; A47F 5/10; A47F 5/0068; H02G 5/04; G09F 3/208
USPC ...................................................... 108/50.02
See application file for complete search history.

(56) References Cited

U.S. PATENT DOCUMENTS

| 4,489,995 | A | * | 12/1984 | Barr | F25D 27/00 312/236 |
| 4,762,072 | A | * | 8/1988 | Boundy | A47B 21/06 108/50.02 |
| 5,348,485 | A | * | 9/1994 | Briechle | H01R 25/14 439/121 |
| 5,425,648 | A | * | 6/1995 | Farham | H01R 25/16 439/116 |
| 5,452,807 | A | * | 9/1995 | Foster | F16M 11/2014 211/168 |
| 7,189,107 | B1 | * | 3/2007 | Strayer | H01R 13/6456 439/501 |
| 7,634,967 | B1 | * | 12/2009 | Albright | B01L 9/02 52/220.8 |
| 8,196,526 | B2 | * | 6/2012 | Rheault | A47B 21/06 108/50.01 |

(Continued)

*Primary Examiner* — Jose V Chen
(74) *Attorney, Agent, or Firm* — Foley IP Law, PLLC

(57) ABSTRACT

Examples provide an adjustable power shelf system. Electrical power is supplied to a power bus running through a shelf support railing. The railing includes a slots for engaging mounting brackets on a shelf. The shelf is removably attached to the railing via the mounting brackets. The mounting bracket includes a plug with a tab sized to fit within the slots when the shelf is mounted on the railing. The tab is guided into position to engage the power bus by a guide formed within nonconducting insulation within the hollow cavity of the shelf support railing. Power flows from the power bus through the tab to wiring on or within the shelf to power peripheral devices. The shelf receives power when it is mounted to the railing and disengages the power bus when removed from the shelf railing without alteration to electrical wiring providing power to peripheral devices.

20 Claims, 16 Drawing Sheets

(56) References Cited

U.S. PATENT DOCUMENTS

| | | | |
|---|---|---|---|
| 9,357,858 B2* | 6/2016 | Sun | A47F 3/001 |
| 10,135,268 B1* | 11/2018 | Gokcebay | H02J 7/0013 |
| 10,432,001 B1* | 10/2019 | Bellis | A47B 57/045 |
| 10,566,746 B1* | 2/2020 | Breeden | H01R 24/78 |
| 10,939,756 B2 | 3/2021 | Peck et al. | |
| 11,592,879 B2* | 2/2023 | Vardaro | G06F 1/189 |
| 2009/0267564 A1* | 10/2009 | Gerber | H02J 7/0013 |
| | | | 320/114 |
| 2009/0284655 A1* | 11/2009 | Lukes | A47B 21/007 |
| | | | 108/50.02 |
| 2012/0312196 A1* | 12/2012 | Newkirk | H02J 7/00045 |
| | | | 108/50.02 |
| 2014/0043797 A1* | 2/2014 | Sun | A47F 3/001 |
| | | | 362/133 |
| 2014/0062390 A1* | 3/2014 | Webber | H02J 7/0013 |
| | | | 320/107 |
| 2014/0331901 A1* | 11/2014 | Seefeldt | A47B 21/06 |
| | | | 108/50.02 |
| 2016/0316939 A1* | 11/2016 | Kraiss | F21V 33/002 |
| 2017/0047751 A1* | 2/2017 | Fernandes | H02J 7/0044 |
| 2019/0298083 A1 | 10/2019 | Lee et al. | |
| 2020/0244313 A1* | 7/2020 | Visconti | H02J 3/00 |
| 2021/0298467 A1* | 9/2021 | Nichols | H02G 3/14 |

* cited by examiner

ADJUSTABLE POWER SHELF SYSTEM

BACKGROUND

In the consumer shopping industry today, it is frequently desirable to supply electricity to product display shelves to power devices such as lights, digital signage, and cameras. Currently electricity is supplied through loose wiring or wiring attached to the exterior of the shelves. This method can not only be an eyesore to customers detracting from the appearance of product displays, but also makes the process of moving shelves more difficult. The wiring to the shelves must be unattached and then later reattached to each shelf every time one of the shelves is added, removed, or relocated. This process is time consuming and inefficient.

SUMMARY

Some examples provide an adjustable power shelf system including a set of shelf support members including a first shelf support member and a second shelf support member. The shelf support members are positioned in parallel. A set of power shelves removably attach to the shelf support members. A power shelf includes a set of support arms. Each support arm includes a mounting bracket at one end. The mounting bracket is shaped to removably couple to one or more of the slots in the shelf support member. A power bus is located inside a hollow cavity within the support member. The power bus receives an electrical power supply from a converter box. A nonconducting insulation within the shelf support member at least partially surrounds the power bus. The nonconducting insulation includes a guide which directs a power tab into position to engage the power bus when the mounting bracket is coupled to the first vertical support member. The mounting bracket includes a plug. The plug has a main body and a tab connected to a first end of the main body. The tab is sized to fit within a support slot on the shelf support member. The tab contacts the power bus to receive the electrical power supply flows from the power bus. A peripheral device connection wire is connected to a second end of the plug. The peripheral device connection wire at least partially embedded within an interior of the shelf. The peripheral device connection wire has a set of connectors configured to connect to one or more electrically powered peripheral devices associated with the set of shelves.

Other examples provide a method for providing power to a plurality of peripheral devices associated with a power shelf system. A converter box associated with a topmost shelf in a set of adjustable shelves converts electrical power from a first voltage to a lower second voltage. A guide associated with nonconducting insulation within a vertical shelf support member guides a tab on a plug associated with a shelf support arm into a position to engage a power bus within the vertical shelf support member. The tab engages the power bus and receives electrical power from the power bus. One or more peripheral devices connected to at least one connection wire associated with a second end of the plug are powered via the electrical power received from the power bus. The power flows through the plug into the connection wire embedded within the interior of the shelf and into the peripheral device(s) connected to a set of connectors exiting the shelf interior via one or more apertures on the shelf.

Still other examples provide an adjustable power shelf including a shelf support arm and a power shelf mounting plug at a first end of the shelf support arm that removably attaches to a shelf support member in a set of shelf support members. The electrical plug includes a main body, a tab at a first end of the main body and a peripheral device connection wire at the second end of the main body. The tab is sized to slide along a guide associated with a nonconducting insulation inside the shelf support member. The guide directs an end of the power tab into position to engage a power bus within a central cavity of the shelf support member during mounting of the shelf onto the shelf support member. A portion of the peripheral device connection wire runs through an interior of the shelf. The peripheral device connection wire has a set of connectors that connect to at least one electrically powered peripheral device associated with the shelf to provide power to the peripheral device(s).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
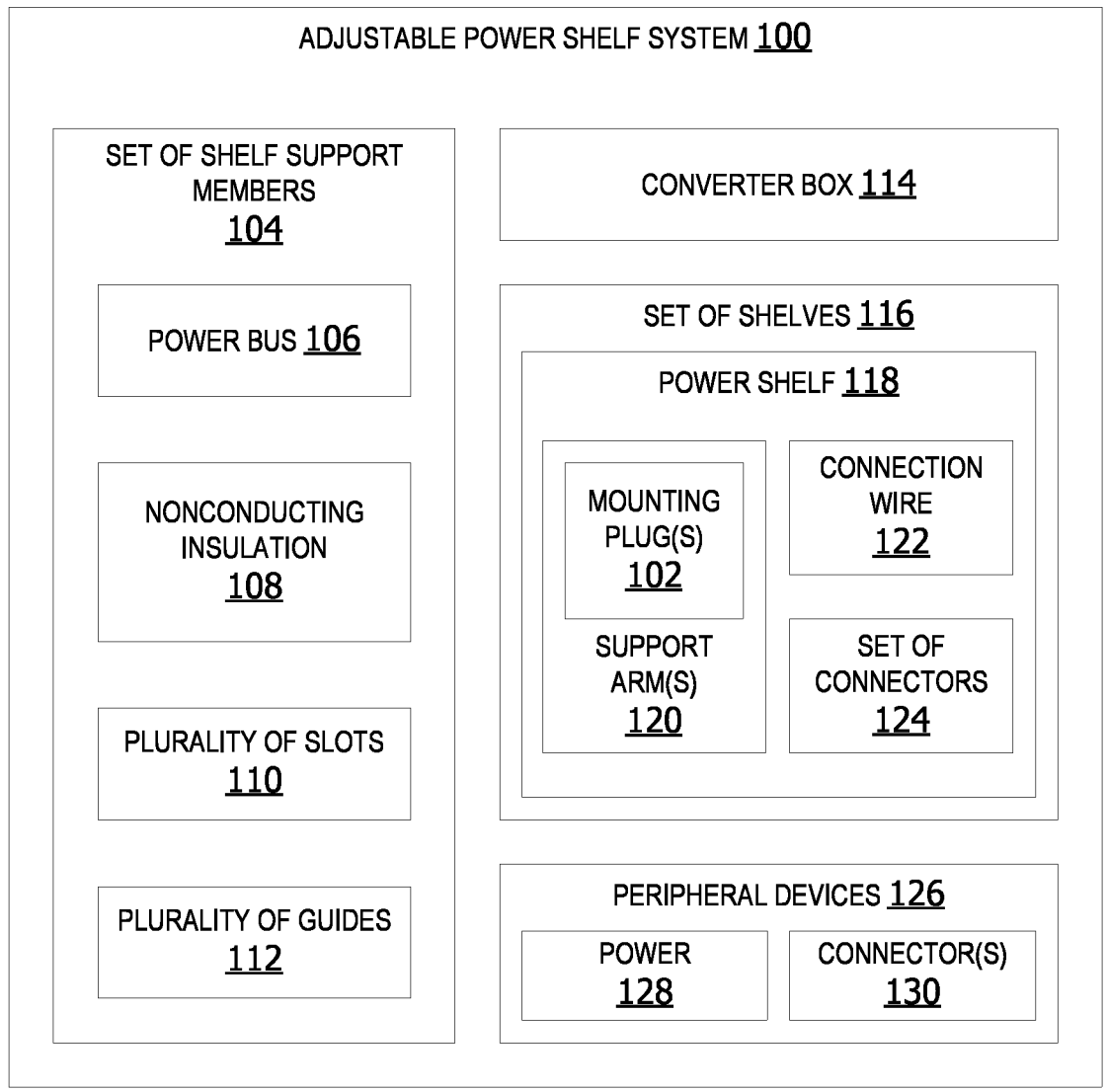
FIG. 1 is an exemplary block diagram illustrating an adjustable power shelf system including mounting plugs.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

It is frequently desirable to include electrically powered peripheral devices on or near shelving. As technology such as digital signage, shelf cameras, lighting, and electronic shelf labels become introduced to store shelves, store aisles and shelving increasingly require sources of power. Power for in-aisle technology can come from sources such as wires, batteries, solar power, or wireless power. Typically, the power requirements for these types of devices are too high for many of these types of devices to rely on batteries, wireless power, or solar power. The power output of these sources is usually not high enough. As the energy requirements for the shelf increases, a wired connection emerges as the only practical solution for power delivery due to the inefficiencies of wireless power and the cost of battery replacement and disposal Wired connections can deliver substantially more power to devices at greater efficiency than other options. Wired connections can be used to accommodate multiple use cases such as video displays and real-time camera feeds. Unfortunately, wired connections come with their own limitations, such as time-consuming manual wiring. Electrical wiring from a nearby outlet requires a user to connect and reconnect the wires to the devices every time the shelves are reset, moved, removed, or adjusted. Moreover, as additional peripheral devices are added, the number of wires and connections required multiplies as well. These wires are unsightly and create potential safety hazards for users. Likewise, if a user attempts to move a shelf without properly disconnecting all the wiring, the shelves, wiring and/or peripheral devices can be damaged.

Referring to the figures, examples of the disclosure enable an adjustable power shelf system. In some examples, a mounting plug on a support arm of a shelf enables the mounting plug to engage a power bus within a vertical shelf support rail when the shelf is removably attached to the vertical shelf support rail. The mounting plug both removably mounts the shelf to the rail and draws power from the power bus automatically when the shelf is mounted on the support rail(s). This enables safe and convenient provision of power to peripheral devices on the shelf without requiring the user to connect or disconnect any electrical wires, plugs or cords when the shelf is moved or adjusted.

Aspects of the disclosure further enable a nonconducting guide to direct a tab of the mounting plug into position to engage the power bus when the shelf is being mounted on the support rail(s). This enables safer and easier attachment of attachment and detachment of shelves on the support rails without damaging the mounting plug.

Other aspects provide a connection wire and a set of connectors on or within the shelf. The connection wire connects to the mounting plug and runs below, behind or within the shelf to deliver power to one or more peripheral devices. The connection wire and device connectors are out-of-view of users for a more aesthetically pleasing appearance, as well as increased safety for users. The wiring integrated into the shelf further enables faster and easier connection and disconnection of shelves at various positions on the support arms without requiring alteration of the wiring.

In still other examples, a converter box is provided on an uppermost shelf which converts power received from a drop-down power supply from a first voltage to a lower, second voltage suitable for utilization by the one or more peripheral devices associated with one or more power shelves. This enables safe and effective delivery of power while eliminating wiring coming up from the floor, wiring wrapping around shelves from the back and/or wiring draped across or in-front of shelves. This improves appearance and safety of the shelves.

Referring again to FIG. 1, an exemplary block diagram illustrating an adjustable power shelf system 100 including one or more mounting plug(s) 102 is shown. The system 100 includes a set of one or more shelf support members 104. A shelf support member in the set of shelf support members 104 is a device for mounting a shelf or a portion of a shelf to a fixture, such as, but not limited to, a wall, a post or other fixture. A shelf support member can be implemented as a rail, pipe, rectangular support frame, or any other device for supporting at least one side of a shelf via a shelf support arm.

In some non-limiting examples, the set of shelf support members are mounted vertically to a wall in a parallel configuration with each other. In these examples, the vertical support members are mounted a distance apart that is equal to the width of one or more shelves to be mounted on the vertical support rails. However, the examples are not limited to vertical support members. In other examples, the shelf support member(s) are mounted horizontally to a fixture for mounting one or more shelves to the shelf support member.

The shelf support members may be composed of metal, plastic, a composite material, or any other suitable material. In one example, the set of shelf support members are implemented as a pair of vertical shelf support rails made of a metal, such as aluminum, steel, or other suitable material.

A shelf support member in the set of shelf support members 104 includes a power bus 106. The power bus 106, in some examples, is a power bus running through a hollow interior of the shelf support member. If the shelf support member is mounted vertically, the power bus 106 also runs vertically through the central hollow cavity of the shelf support member.

The power bus 106 runs the entire length of the shelf support member in some examples. Thus, if the shelf support member is a ten-foot-long metal shelf support rail, the power bus runs through the entire ten-foot length of the rail.

A nonconducting insulation 108 provides a buffer between the power bus and a housing of the shelf support rail. The nonconducting insulation fills the interior cavity of the shelf support member between the walls of the housing and the power bus. In this manner, the nonconducting insulation 108 buffers the power bus and fills most of the empty spaces remaining with the cavity. The power bus is isolated from the metal frame of the shelf support member (rail) by the buffer provided by the insulation. In some examples, the insulation is plastic. However, the insulation is not limited to plastic insulation.

The housing of the shelf support member includes a plurality of slots 110 in a front face of the shelf support member. A slot in the plurality of slots is a mounting slot which enables a mounting plug to couple to the shelf support member. In some examples, the slots are arranged equidistance apart in a row along the length of the front face.

A slot, in some examples, is a substantially oval shaped slot or aperture on one of the faces of the shelf support member. However, the examples are not limited to an oval shaped slot. In other examples, the slots may be round, square, horizontal, triangular-shaped, or any other shape sized to enable a portion of the mounting plug to fit within the slot during mounting of the shelf.

In other examples, a plurality of guides 112 are provided within the cavity of the shelf support member. Each guide in the plurality of guides corresponds to a slot in the plurality of slots 110. Each guide is located at an aperture associated with a slot in the plurality of slots to assist correct positioning of at least a portion of a mounting plug being inserted into the slot during mounting or dismounting of the shelf.

The guide provides a shaped rim, lip, edge, track, indentation, surface, or other formation within the interior cavity of the shelf support member which directs or otherwise guides a portion of the mounting plug into contact with the power bus 106. The portion of the mounting plug coupling to a slot in the shelf support slides or glides along the guide to engage the power bus.

In some examples, the guide is a funnel-shaped guide. If a misalignment occurs as the mounting plug is inserted into the slot(s) of the shelf support member (rail), the funnel shape of the insulator acts as a guide which corrects the position of the plug tab as it goes in. Thus, the guide enables the mounting plug attachment to self-correct itself as it goes in.

In other examples, the guide is implemented as a slot or formation molded within the nonconductive insulation 108. However, the examples are not limited to a guide formed by or molded within the nonconductive insulation. In other examples, each guide can be a separate guide member which attached to the slot or within the interior cavity of the shelf support member, such as, but not limited to, instances in which the nonconducting insulation is absent from the interior of the shelf support member and/or where the guide is composed of a material other than the nonconducting insulation 108.

A converter box 114 is a power converter (transformer) that converts electrical power at a first voltage down to a lower, second voltage. For example, the converter box 114 can step down 220V to 12V. In another example, the converter box 114 can change 120V electricity to 12V. In some examples, the converter box 114 is located at a top of a set of shelves 116 and/or attached to the highest shelf in the set of shelves 116.

The set of shelves 116 is a set of one or more power shelves, such as, but not limited to, power shelf 118. The set of shelves 116 are shelves configured to mount to the set of shelf support members via a set of one or more shelf support arm(s) 120. In some examples, each shelf includes a first support arm attached to a first side of the shelf and a second support arm attached to a second side of the shelf.

In some examples, the set of shelves 116 is a set of open shelves or shelves in a display. In other examples, the set of shelves include one or more shelves within a refrigerated display case, one or more shelves within a freezer display, one or more shelves within a deli display case, one or more shelves on an end-cap display, one or more shelves on a rotating display, one or more shelves within an enclosed glass display case, or any other type of shelving unit having at least at least one mounting plug associated with at least one shelf engaging a power bus.

The power shelf 118 includes one or more mounting plug(s) 102 at one end of one or more support arms. In some examples, one mounting plug is provided at an end of one support arm on one side of each shelf.

In some examples, the mounting plug includes a bracket member for removably attaching the support arm to at least a portion of the shelf support member. The mounting plug also includes a plug having a tab for engaging the power bus 106 within the shelf support arm to receive electrical power at the second, stepped-down voltage.

A connection wire 122 connected to an end of the mounting plug(s) 102 carries the electrical power to a set of one or more connectors 124. Each connector in the set of connectors 124 couples to one or more connector(s) 130 associated with one or more peripheral device(s) 126 to deliver power 128 to the peripheral devices. A peripheral device is a device that runs on electricity which is on or otherwise attached to the shelf. A peripheral device can include, for example, but without limitation, a shelf light, an electronic shelf display, a camera, a motion detector, a coupon dispenser, or any other device. An electronic shelf display is a display screen, electronic shelf label, electronic tag, shelf edge display or other display.

The electronic shelf display can include text, graphics, audio and/or video information output to a user. An electronic shelf display can provide promotional information, discount information, product labeling information, videos, or other output displayed to the user.

Thus, the power shelf system 100 in this example sends power down one rail of the set of shelf support members. Each shelf has a plug equipped to engage the power bus and pull power out. The mounting plug automatically disengages when the shelf support arms are removed from the shelf support members. Thus, there are no wires to disconnect or reconnect when shelves are reset, moved, removed, or added to the set of shelves. Moreover, the mounting plug operates with a variety of shelf mounting systems. Therefore, modification of the shelf support members (rails) is unnecessary.

Figure 2:
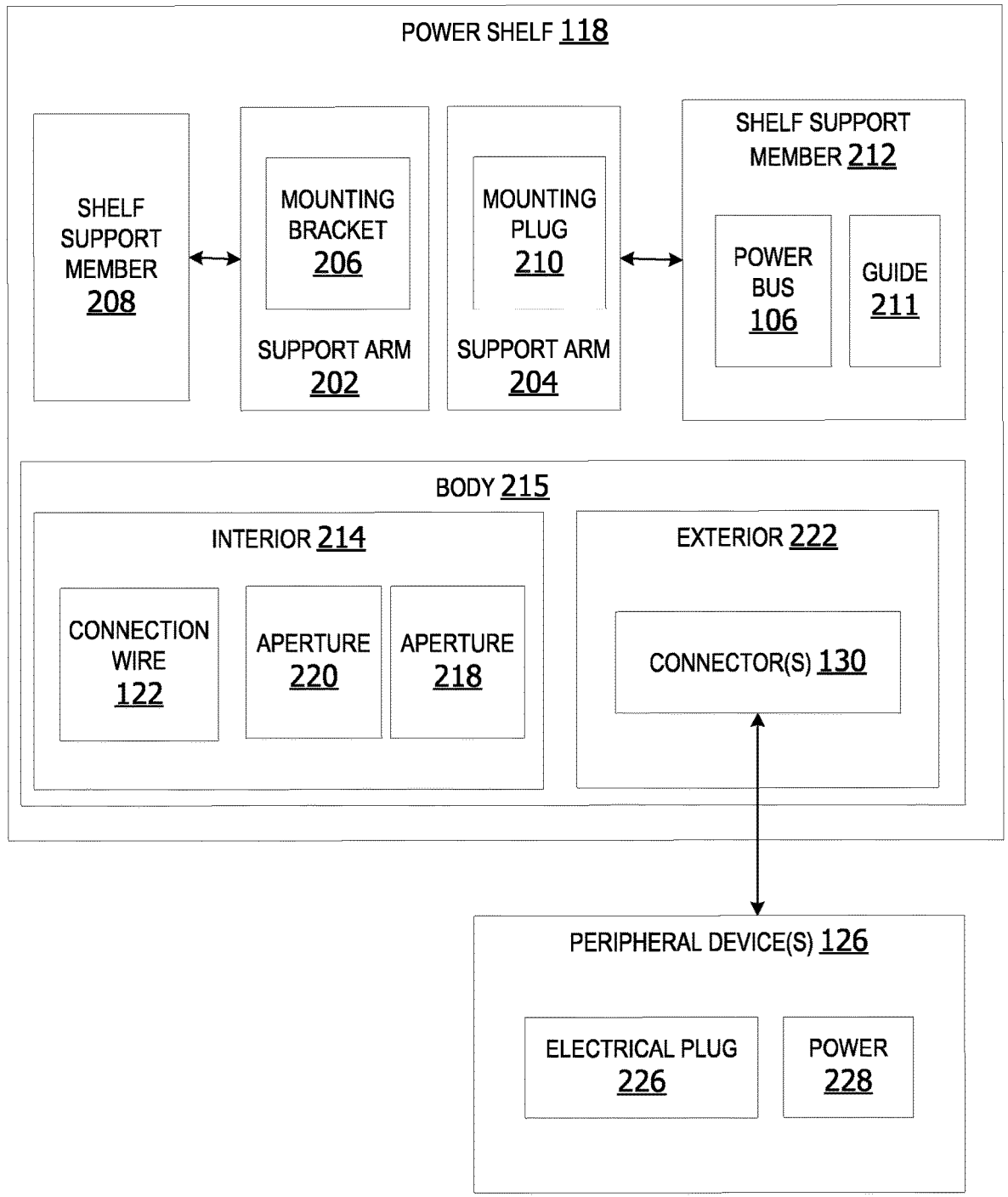
FIG. 2 is an exemplary block diagram illustrating a power shelf including at least one mounting plug.

FIG. 2 is an exemplary block diagram illustrating a power shelf 118 including at least one mounting plug 210. The power shelf 118 is a shelf in a set of shelves within an adjustable power shelf system, such as, but not limited to, the set of shelves 116 in FIG. 1.

The power shelf 118 in this example, includes a first support arm 202 attached to a first side of the shelf 118. A mounting bracket 206 is located at the end of the first support arm 202. In this example, the mounting bracket 206 at the end of the support arm 202 removably attaches to a portion of the shelf support member 208. The shelf support member 208 in some examples acts as a ground rail.

In this example, the shelf support member 208 is a vertically mounted shelf support rail having a plurality of slots. The mounting bracket is sized to couple to one or more of the slots in the plurality of slots.

The mounting plug 210 is attached to an end of a second support arm 204. The mounting plug includes a mounting bracket and a plug configured to receive power from the power bus 106.

The second support arm 204 is attached to a second side of the power shelf 118. The mounting plug 210 removably attaches to a portion of a second shelf support member 212.

In this example, the second shelf support member 212 is a vertically mounted shelf support rail having a plurality of slots within a front face of the shelf support member 212.

The power bus 106 runs vertically through the interior cavity of the shelf support member. A guide 211 associated with at least one slot is shaped to enable a portion of the mounting plug 210 to smoothly engage a portion of the power bus 106. In this non-limiting example, the guide 211 directs a tab on the mounting plug 210 to engage the power bus. When the tab of the mounting plug 210 contacts the power bus, electrical power flows from the power bus into the mounting plug.

The mounting plug 210 includes a connection wire 122 having a set of connectors 130 attached to one or more ends of the connection wire. The connection wire 122 is a wire for carrying electrical power from the mounting plug 210 to the peripheral device(s) 126. However, the examples are not limited to a single wire. In some examples, the connection wire 122 is a bundle of wires or a wiring harness including two or more electrical wire. Each wire in the bundle of wires or the wiring harness includes a connector in the set of connectors 130 at each end of each wire. In other examples, the connection wire is a single wire having multiple end points connected to two or more connector(s) 130 in the set of connector(s) 130.

In these examples, the connection wire 122 attaches to the mounting plug 210 at one end. The other end of the connection wire enters a first aperture 218 in a portion of an exterior 222 surface of a main body 215 of the power shelf 118 to enter the interior 214 of the power shelf 118. The main body 215 is the shelf board or other shelf platform having a support arm attached to each side of the main body. The main body includes an upper surface for displaying items and an underside. The main body may be solid or hollow. In this example, the main body 215 is hollow, permitting the wiring to be run through the shelf via two or more apertures in the main body. In other examples, where the main body is solid, the wiring may be run behind the shelf main body and/or along the underside of the main body.

The connection wire runs through the interior of the power shelf and exits the interior of the power shelf via a second aperture 220. The one or more connector(s) 130 attach to the end(s) of the connection wire 122 on the exterior 222 of the shelf 118.

In some examples, the connection wire 122 includes multiple wires in a bundle or wiring harness, where each end of each wire in the bundle or wiring harness exits the power shelf 118 at a different aperture in the shelf. Thus, two or more connection wire ends can exit the interior of the shelf via the same aperture 220 and/or via two or more different apertures.

In some examples, each connection wire end exits via a different aperture, connecting with a connector in the set of connectors. Each connector in the set of connector(s) 130 connects to a connector on an electrical plug 226 of a different peripheral device. Thus, in these examples each connection wire end connector (adapter) can connect to a different peripheral device. In this manner, multiple peripheral devices can connect to a different connection wire in the connection wire bundle or connection wire end to receive power 228 from the mounting plug engaging the power bus 106.

Figure 3:
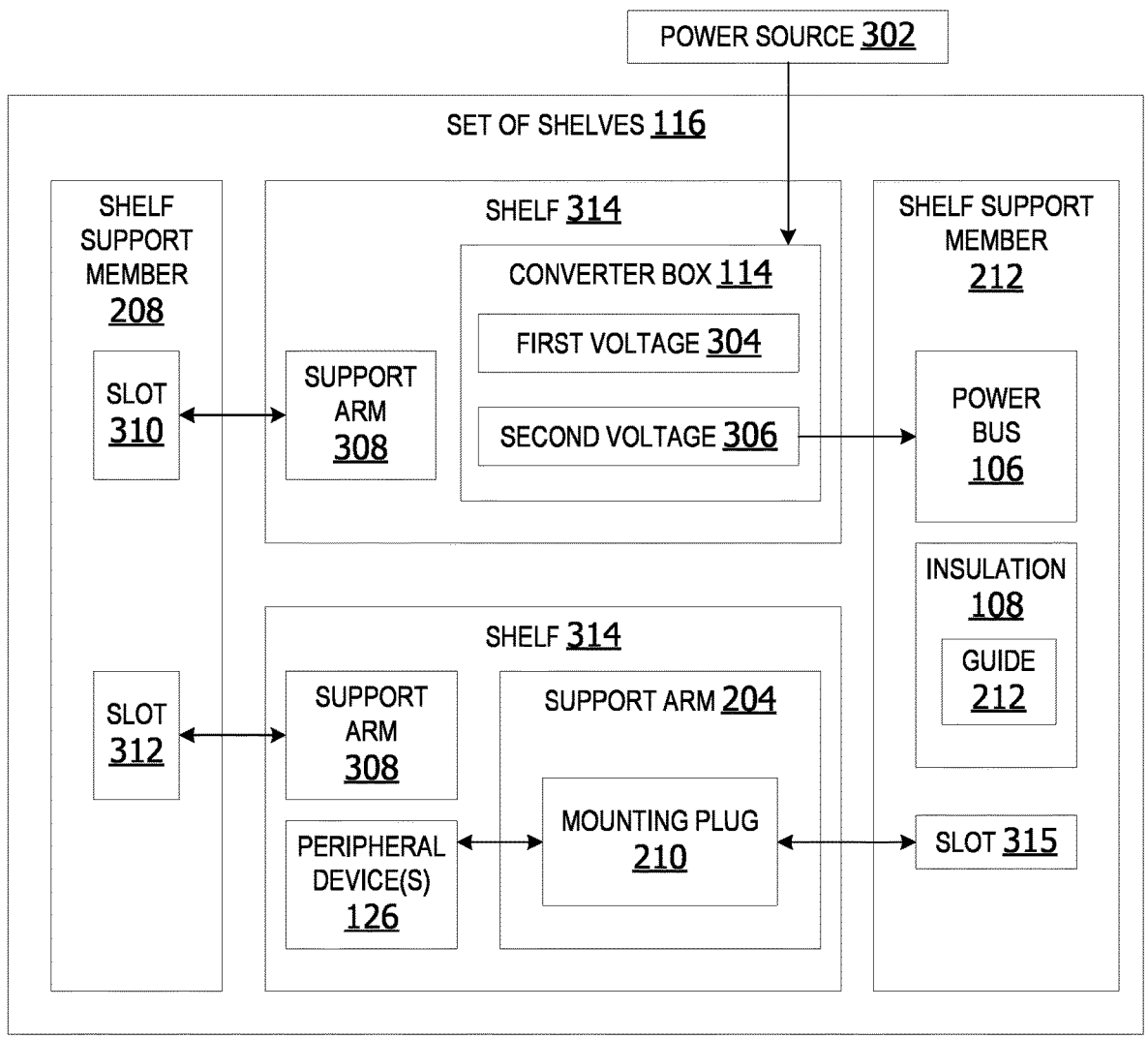
FIG. 3 is an exemplary block diagram illustrating a set of shelves associated with the adjustable power shelf system.

Turning now to FIG. 3, an exemplary block diagram illustrating a set of shelves 116 associated with the adjustable power shelf system is depicted. In this example, a power source 302 is an external power source providing electrical power at a first voltage 304 to a converter box 114. The converter box steps down the voltage from the first voltage 304 to a second voltage 306. The converter box 114 provides the power at the second voltage 306 to the power bus 106. The power bus runs through the shelf support member 212. The power bus does not run through the opposite shelf support member 208.

The shelf 314 is a topmost shelf in the set of shelves 116 in this non-limiting example. The converter box 114 sits on a top surface of the shelf 314 or it is attached to the shelf 314. In other examples, the converter box is attached to a portion of the shelf 314, such as, but not limited to, a side of the shelf, a back of the shelf, an underside of the shelf, or some other portion of the shelf. The shelf 314 is removably mounted to the shelf support member 208 via a support arm 308. The support arm 308 attaches to one or more slots, such as slot 310, via an attachment bracket on the support arm 308. The shelf 314 can include a second support arm (not shown) which attaches to the shelf support member 212 via an attachment bracket and/or a mounting plug.

The power bus 106 includes nonconducting insulation 108 which surrounds or partially surrounds the power bus within the interior hollow cavity of the shelf support member. The nonconducting insulation forms one or more guides, such as, but not limited to, a guide 211. The guide 211 serves to direct a portion of a mounting plug 210 into a correct position within a portion of the interior of the shelf support member during mounting, such that the tab comes in direct contact with a portion of the power bus 106.

A shelf 316 is a power shelf. The shelf 316 attaches to the shelf support member 208 via a support arm 202 which removably couples to one or more slots, such as, but not limited to, a slot 312. A second support arm 204 removably couples the shelf support member 212 via a mounting plug 210. The mounting plug 210 includes a tab and/or a mounting member which removably couples to one or more slots on the shelf support member, such as, but not limited to, a slot 315.

Figure 4:
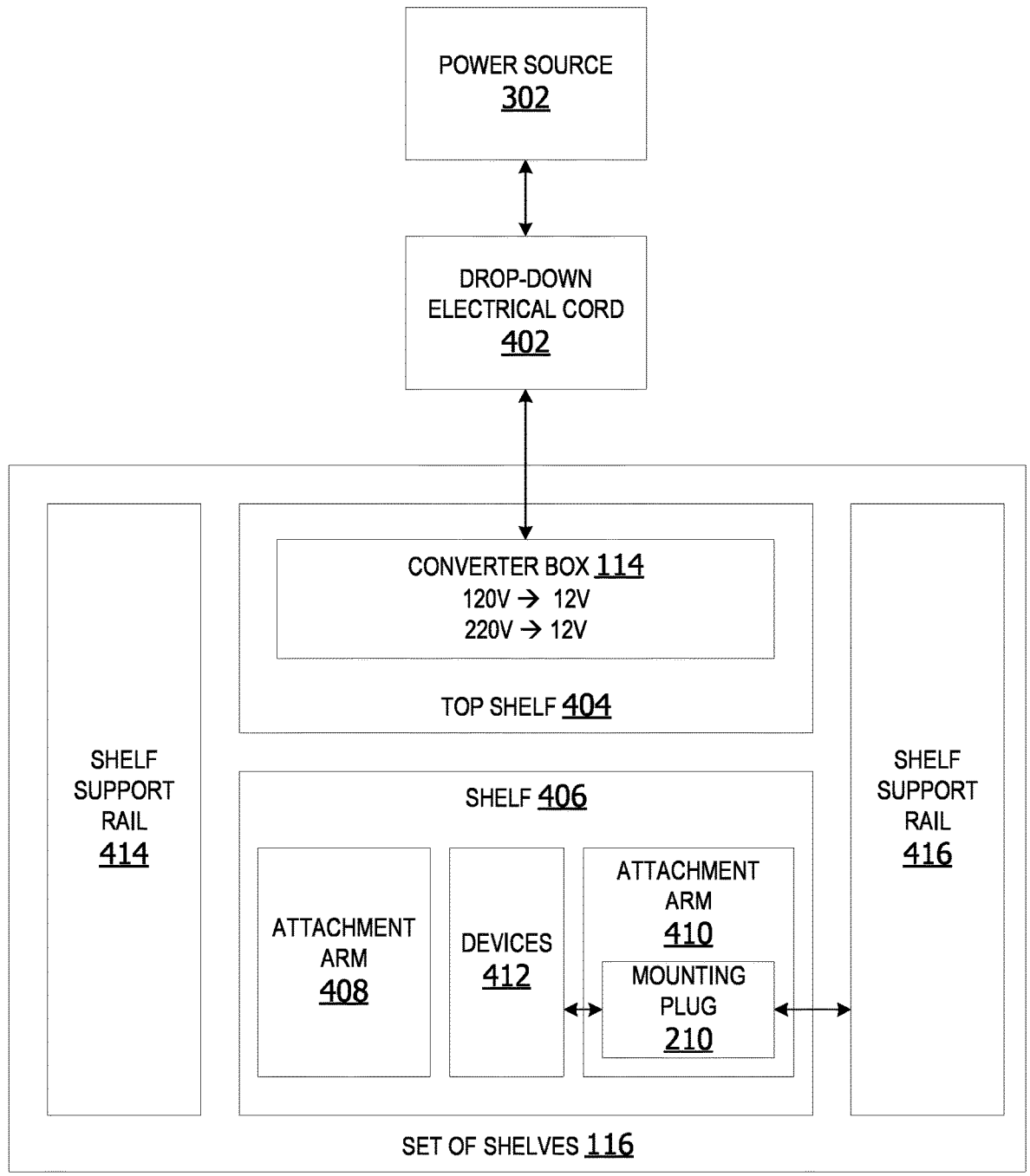
FIG. 4 is an exemplary block diagram illustrating a set of power shelves receiving power from an external power source via a drop-down electrical power supply.

FIG. 4 is an exemplary block diagram illustrating a set of power shelves 116 receiving power from an external power source 302 via a drop-down electrical power supply. The external power source 302 can include power received from an electrical utility, power from a generator, power from one or more solar panels, power received from one or more batteries, or any other power source.

The drop-down electrical cord 402 is a bundle of one or more electrical cords carrying electricity at a first voltage to the converter box 114. In this example, the first voltage is a voltage of 120 volts or 220 volts. The converter box converts the power to a second voltage. In this non-limiting example, the voltage is stepped down to 12 volts. However, the examples are not limited to converting an incoming voltage of 120V and/or 220V to a lower voltage of 12V. In other examples, the incoming power may be converted to 10V or any other suitable voltage to power the peripheral devices 412.

In this example, the converter box 114 is attached to a top shelf 404 in the set of shelves 116. However, the examples are not limited to attaching the converter box to the top shelf 404. In other examples, the converter box can be attached to a side of the set of shelves, a top portion of the shelf support member, a lower shelf in the set of shelves, mounted to a wall, or any other appropriate location.

A power shelf 406, in some examples, includes an attachment arm 408 for removably attaching one side of the shelf 406 to a first shelf support rail 414. The first shelf support rail is a shelf support member. A second attachment arm 410 removably attaches a second side of the shelf 406 to a second shelf support rail 416. The second shelf support rail 416 is a shelf support member. In this non-limiting example, the shelf support rail 414 is located parallel to the second shelf support rail 416. In this non-limiting example, the first shelf support rail 414 is located a distance from the second shelf support rail that is the same as the width of the shelf.

The second attachment arm 410 includes the mounting plug 210 at an end of the second attachment arm 410. The mounting plug 210 includes a bracketing member that removably mounts the attachment arm to the shelf support rail 416 and provides a tab for engaging the power bus to receive power.

Figure 5:
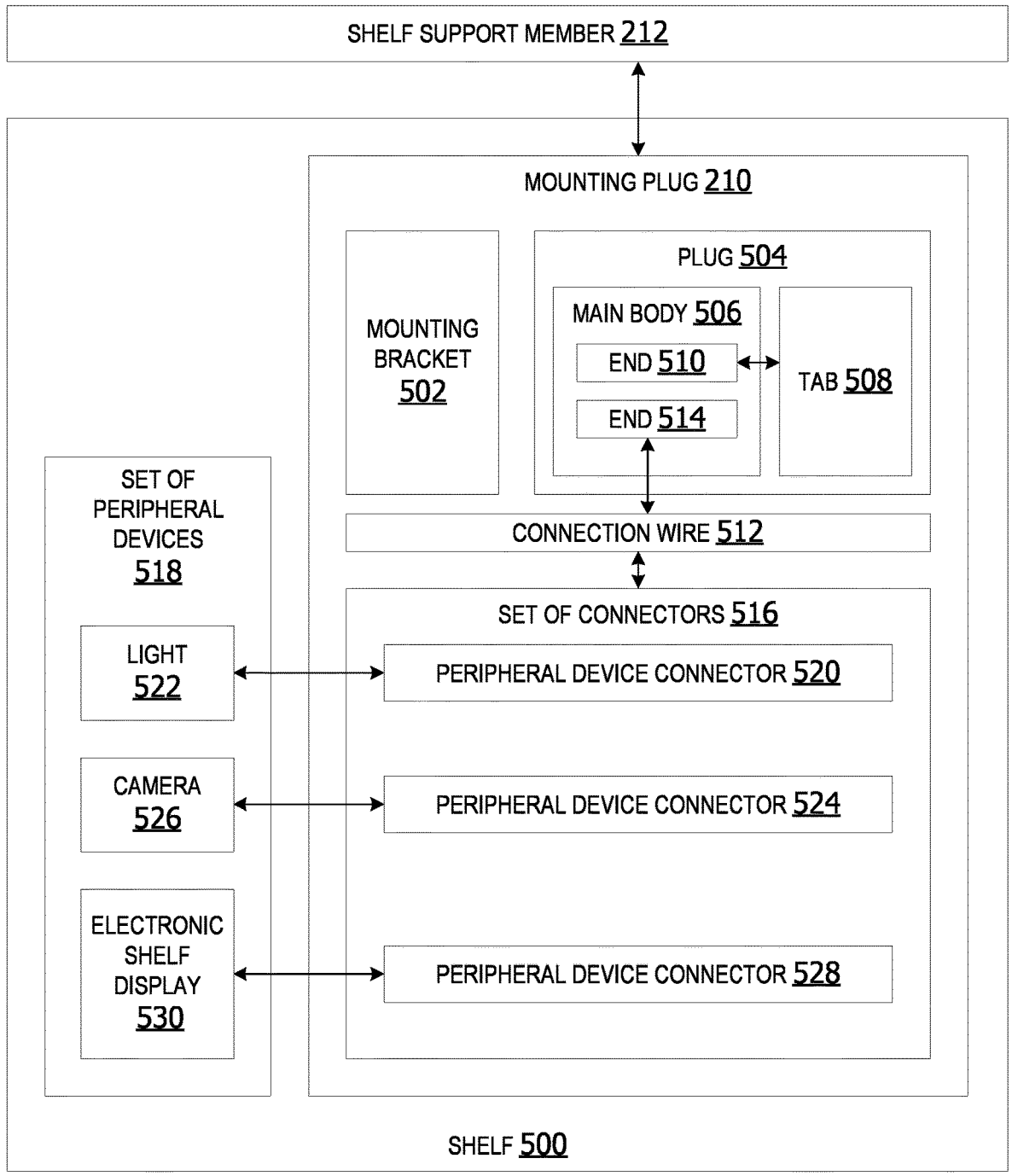
FIG. 5 is an exemplary block diagram illustrating a shelf in the set of power shelves having a mounting plug for engaging a power bus embedded within a shelf support member.

Referring again to FIG. 5, an exemplary block diagram illustrating a shelf 500 in the set of power shelves having a mounting plug 210 for engaging a power bus embedded within a shelf support member is shown. In this non-limiting example, the mounting plug 210 includes a mounting bracket 502 which engages one or more mounting slots on a shelf support member 212.

A plug 504 includes a main body 506. A tab 508 associated with a first end 510 of the main body is adapted to engage a power bus within the shelf support member 212. In some examples, the tab is composed of a conducting material, such as, but not limited to, copper. The tab can be partially enclosed in a nonconducting coating or nonconducting insulation, such as, insulating tape or a sleeve. The tip of the conducting tab is uninsulated to permit electrical power to flow through the tip of the tab when the tip of the tab contacts the power bus or comes into proximity with the power bus.

A connection wire 512 is connected to the second end 514 of the main body at a first end of the wire. A set of connectors 516 attached to the opposite end of the connection wire is adapted to couple or removably connect to one or more connectors on a set of peripheral devices 518. For example, a first peripheral device connector 520 connects with a light 522 in one example. The light 522 can include undershelf lighting, above shelf lighting, or any other type of lighting.

In another non-limiting example, a peripheral device connector 524 connects to a camera 526. The camera 526 can include one or more cameras. In one example, the camera can include a camera for capturing images of items on the shelf.

In yet another example, a peripheral device connector 528 connects to an electronic shelf display 530. The electronic shelf display can include one or more electronic shelf labels, one or more display devices or any other type of display. A display device can include a light emitting diode (LED) display screen.

Figure 6:
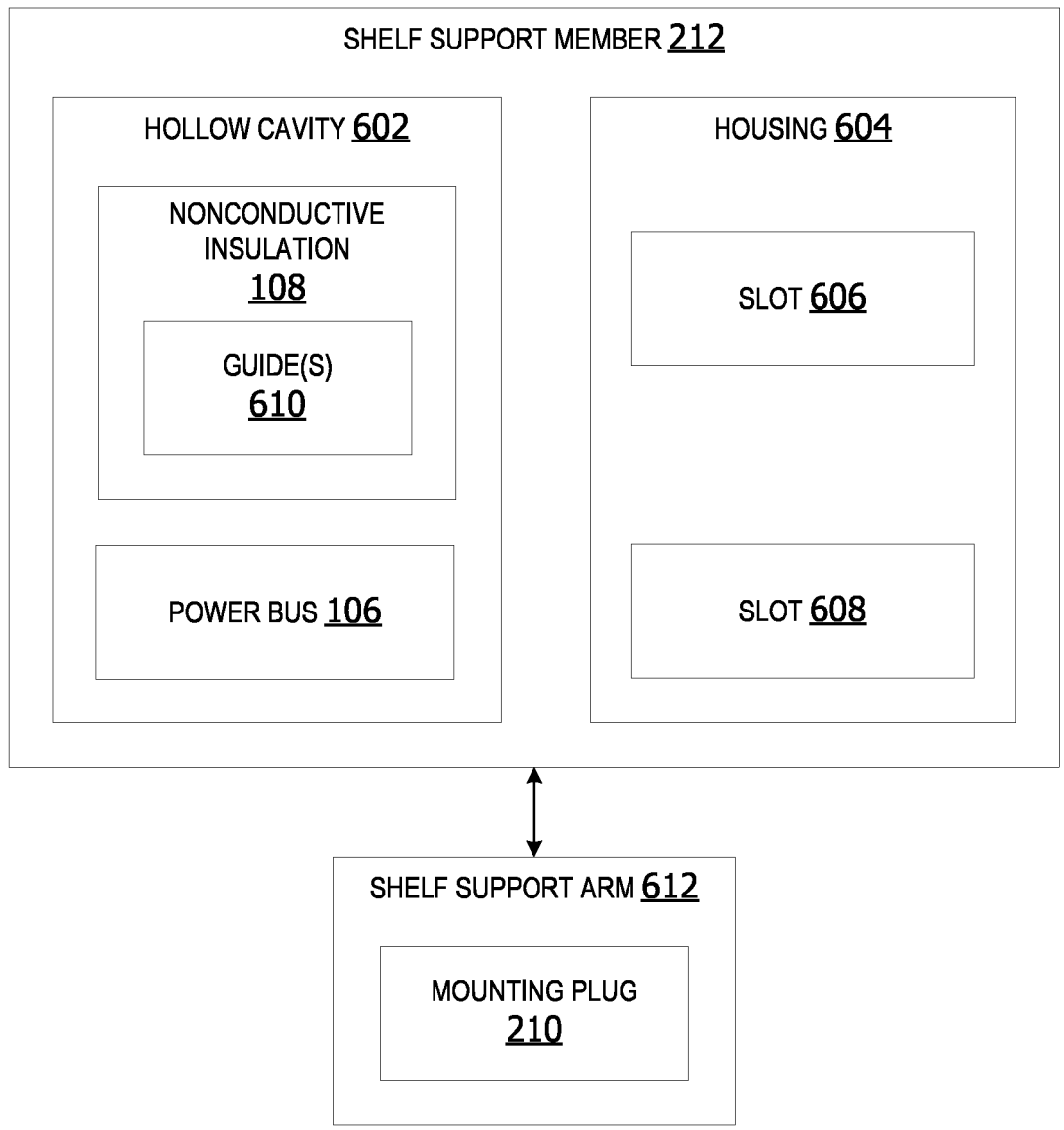
FIG. 6 is an exemplary block diagram illustrating a shelf support member including a power bus and a plurality of guides corresponding with slots for removably attaching a mounting plug associated with a power shelf support arm to the shelf support member.

FIG. 6 is an exemplary block diagram illustrating a shelf support member 212 including a power bus 106 and a plurality of guides corresponding with slots for removably attaching a mounting plug 210 associated with a power shelf support arm 612 to the shelf support member 212. The shelf support member 212, in some examples, includes a hollow cavity 602 within a housing 604. The housing includes a plurality of slots within a front face of the housing 604, such as, but not limited to, slot 606 and/or slot 608.

A nonconductive insulation 108 within the hollow cavity 602 forms one or more guide(s) 610 within the hollow cavity 602. The guide(s) 610 are located proximate to each slot in the housing 604. For example, the nonconductive housing can include a first guide corresponding to the slot 606 and a second guide associated with the slot 608.

In other examples, the guide runs vertically through the shelf support member such that the guide forms a conical-shaped formation associated with each slot in the plurality of slots sized to direct any mounting plug tag toward the power bus during mounting of the shelf support arm 612.

Figure 7:
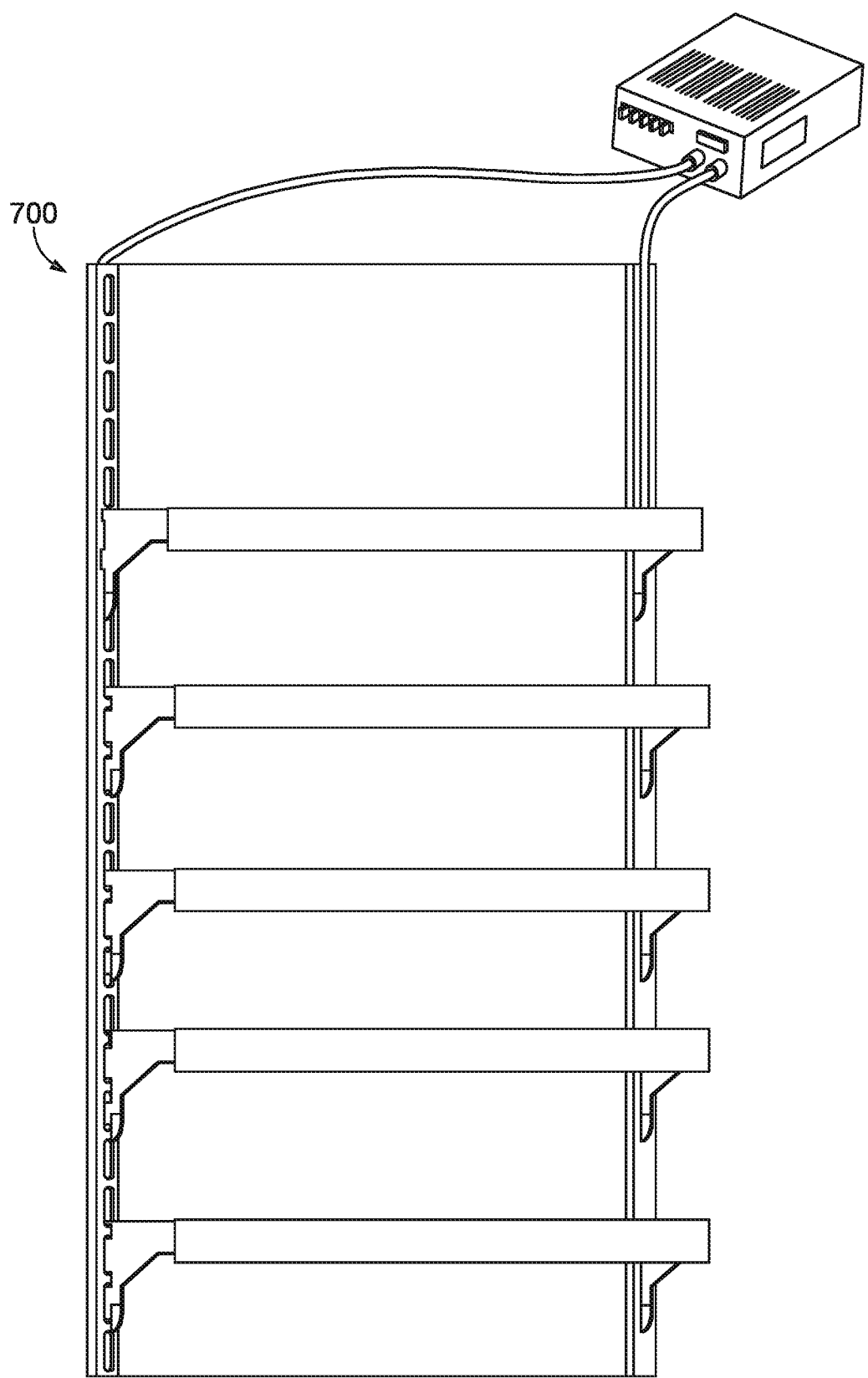
FIG. 7 is an exemplary block diagram illustrating a set of power shelves having a set of electronic shelf display peripheral devices.

Turning now to FIG. 7, an exemplary block diagram illustrating a set of power shelves 700 having a set of electronic shelf display peripheral devices is shown. In this non-limiting example, the electronic shelf display peripheral devices receive power via one or more power shelves within the set of shelves 700 receiving power from a power bus via a mounting plug on each power shelf. The power bus receives power from a converter box located above the set of shelves. In other examples, the converter box is attached to the highest shelf in the set of shelves. Power flows from the converter box down the power bus to each power shelf.

Figure 8:
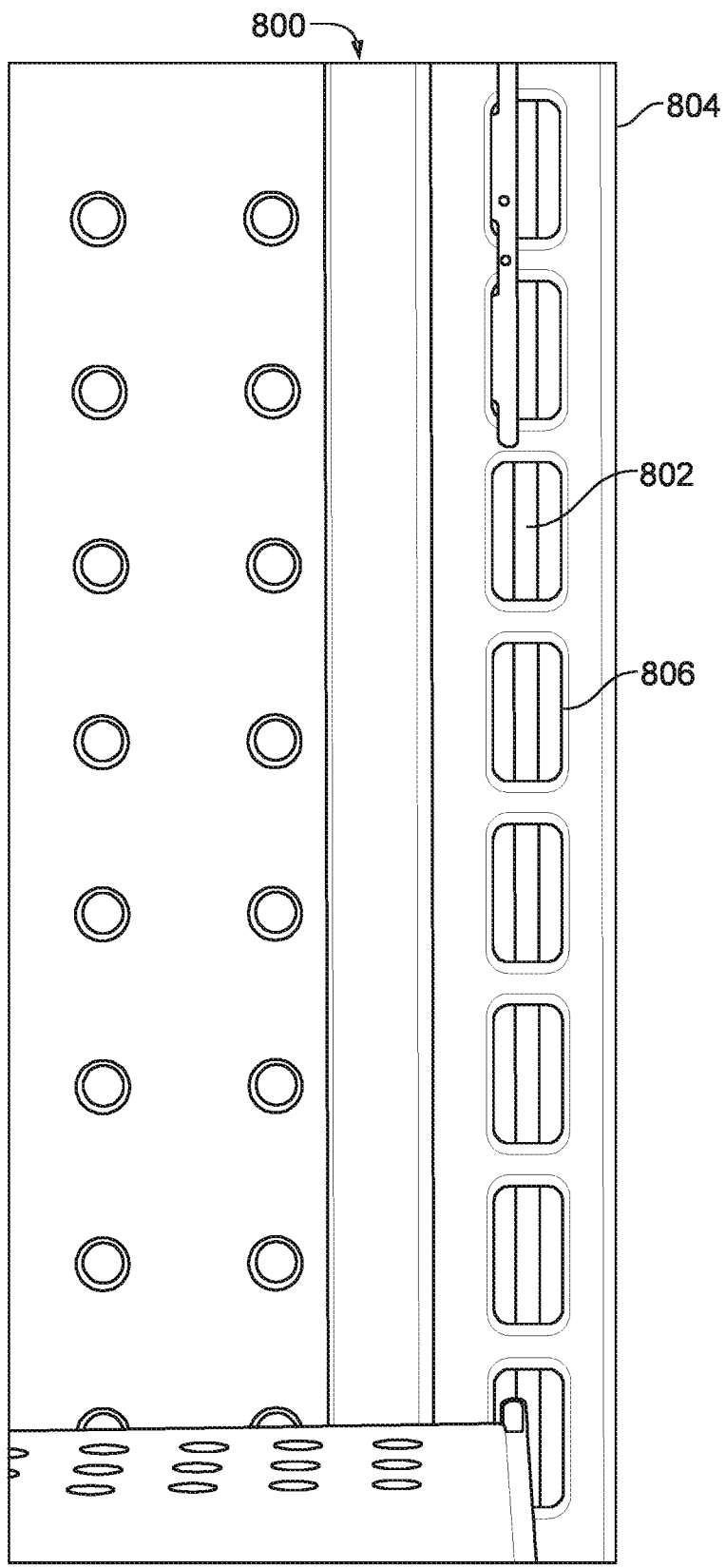
FIG. 8 is an exemplary block diagram illustrating a power bus running through an interior of a shelf support member.

Referring again to FIG. 8, an exemplary block diagram illustrating a power bus 802 running through an interior of a shelf support member 800 is depicted. In this example, the shelf support member 800 includes a plurality of mounting slots, such as, but not limited to, the slot 806. Through the slot aperture, the power bus 802 partially buffered by the nonconducting insulation on either side can be seen.

Figure 9:
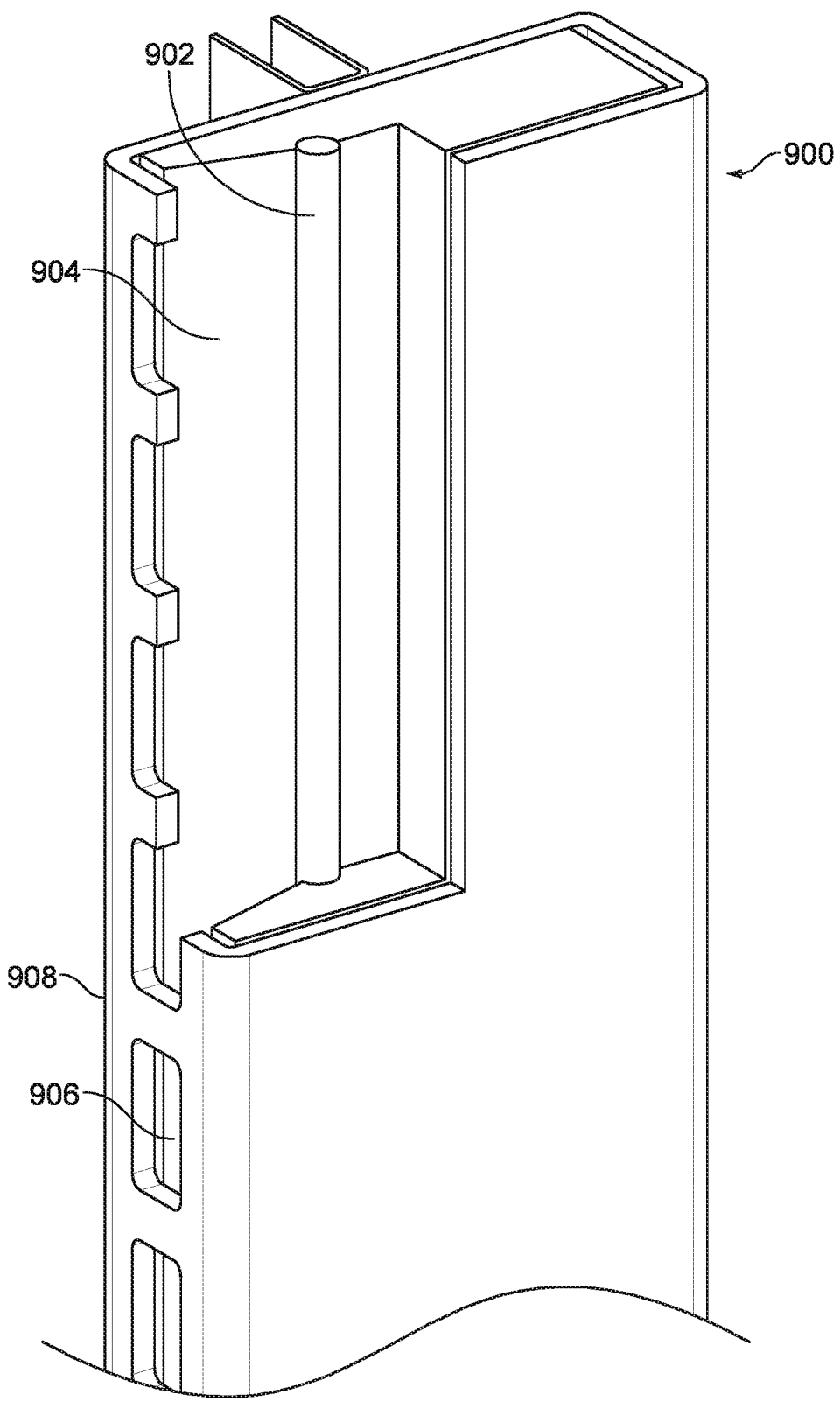
FIG. 9 is an exemplary block diagram illustrating a power bus surrounded by nonconducting insulation within an interior hollow cavity of a shelf support member.

FIG. 9 is an exemplary block diagram illustrating a power bus 902 surrounded by nonconducting insulation 904 within an interior hollow cavity of a shelf support member 900. In this non-limiting example, the shelf support member 900 is shown in a partial cutaway view showing a partial view of the nonconducting insulation. A plurality of slots are present within a front face 908 of the shelf support member, such as, but not limited to, the slot 906. A mounting plug associated with a power shelf support arm removably couples to one or more of the slots to mount the shelf to the shelf support member at a desired vertical height above a floor or other surface.

Figure 10:
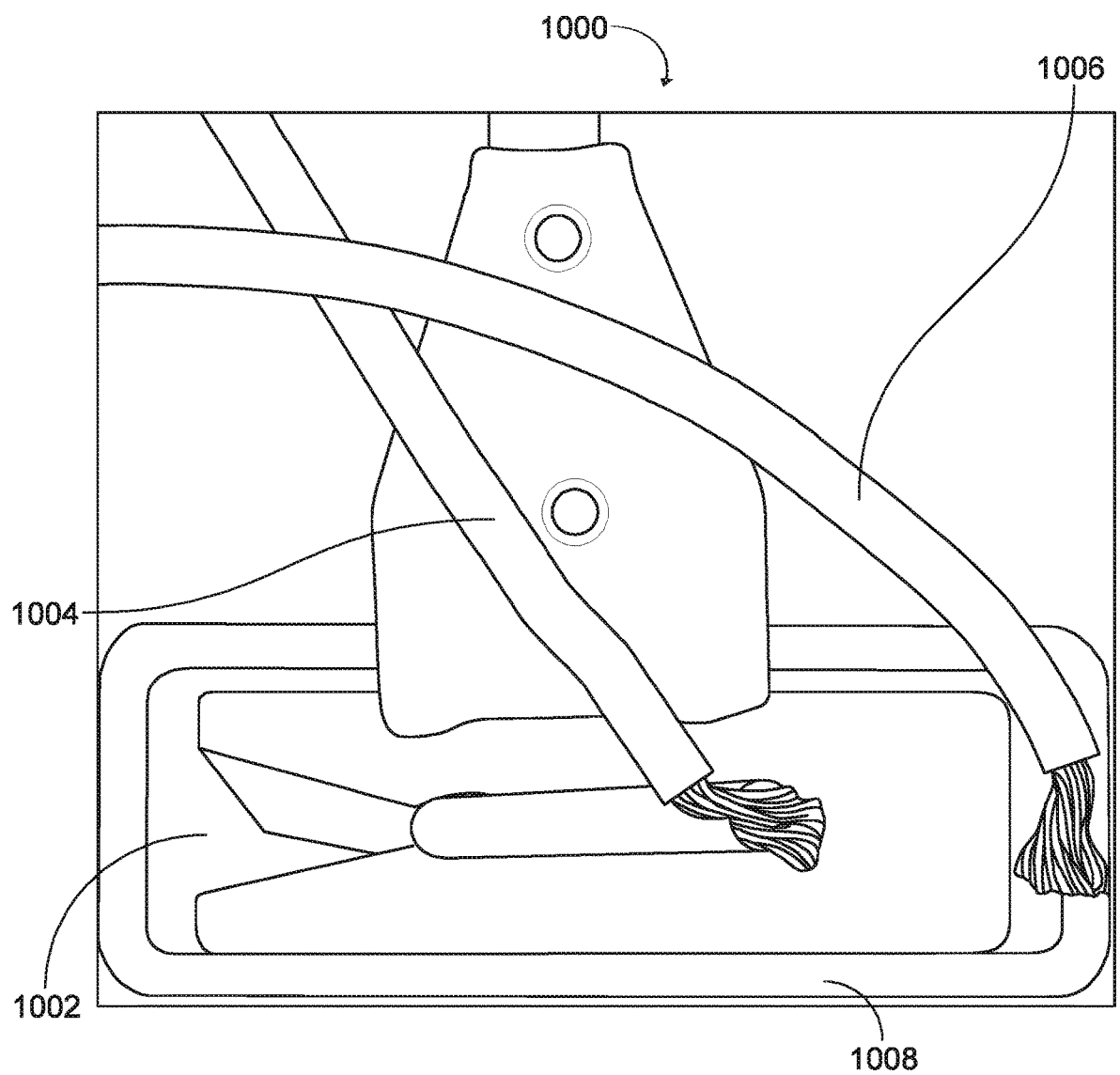
FIG. 10 is an exemplary block diagram illustrating a cross section view of a shelf support member including nonconducting insulation forming a guide.

FIG. 10 is an exemplary block diagram illustrating a cross section view of a shelf support member 1000 including nonconducting insulation forming a guide 1002 for directing a mounting plug tab into position to engage the power bus. The guide 1002 is associated with at least one slot within the housing 1008 of the shelf support member 1000. The connection wire 1004 carries electrical power received from the power bus. A ground 1006 may be provided to ground the electrical current. In other examples, the frame of the set of shelves is composed of a conducting metal and acts as the ground. In still other examples, the opposite rail to the rail having the power bus provides a ground rail.

Figure 11:
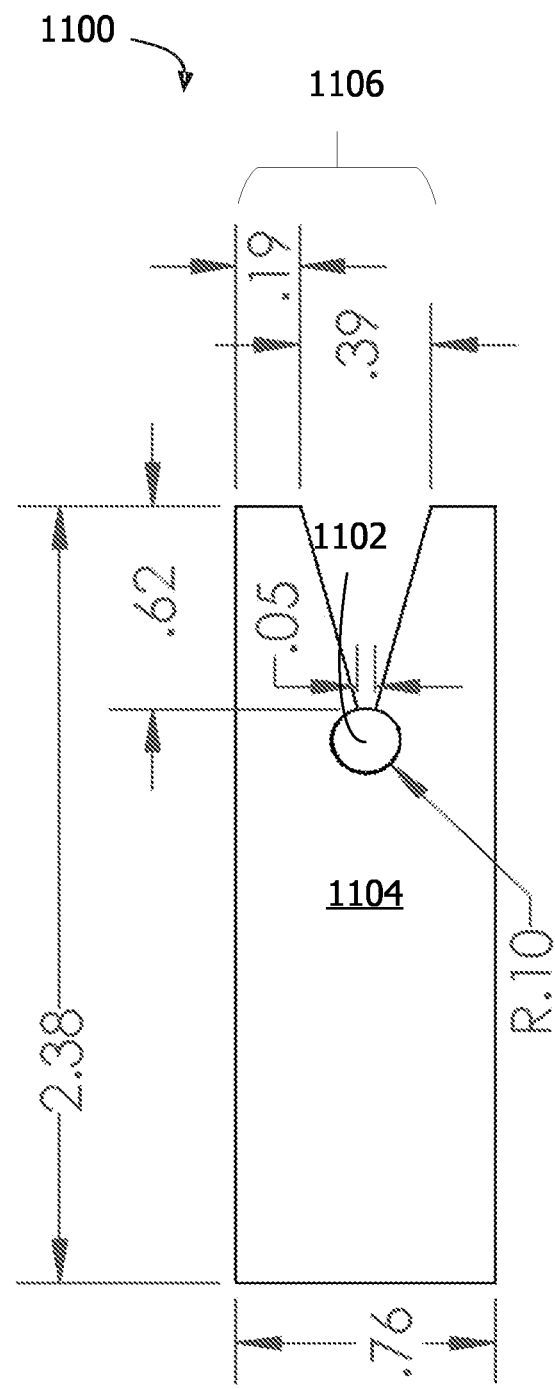
FIG. 11 is an exemplary block diagram illustrating a cross section of an interior of a shelf support member including a power bus and a guide.

Turning now to FIG. 11, an exemplary block diagram illustrating an interior 1104 of a shelf support member 1100 including a power bus 1102 and a guide 1106 is shown. In this non-limiting example, the guide is a conical-shaped formation in the nonconducting insulation.

Figure 12:
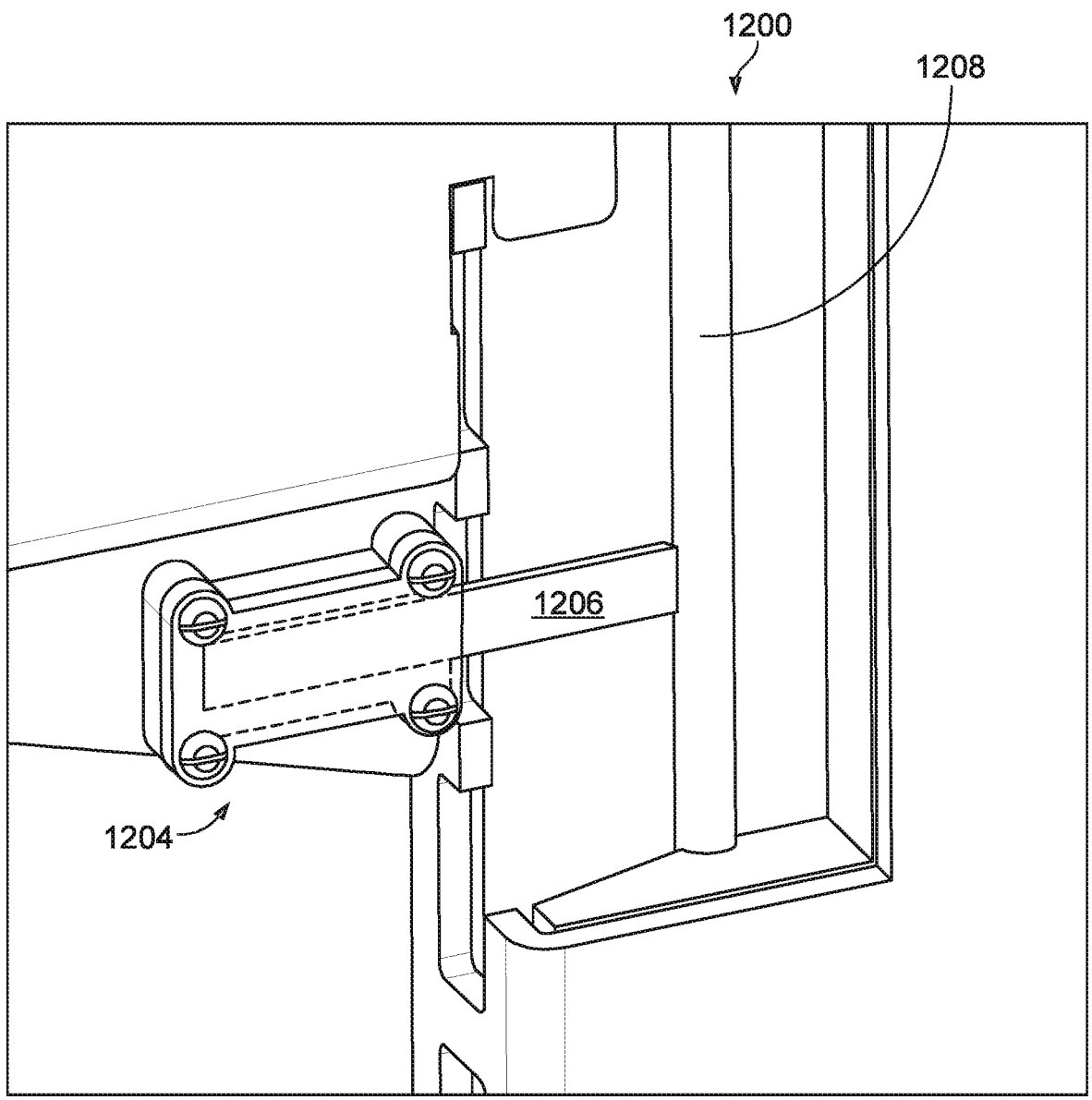
FIG. 12 is an exemplary block diagram illustrating a mounting plug associated with a shelf support arm.

FIG. 12 is an exemplary block diagram illustrating a mounting plug 1204 associated with a shelf support arm 1200. A tab 1206 of the mounting plug 1204 engages the power bus 1208. In some examples, the plug is reinforced and covered in plastic. In other examples, the plug is covered in shrink tubing and/or tape. The covering improves durability and reduces wear on the plug.

Figure 13:
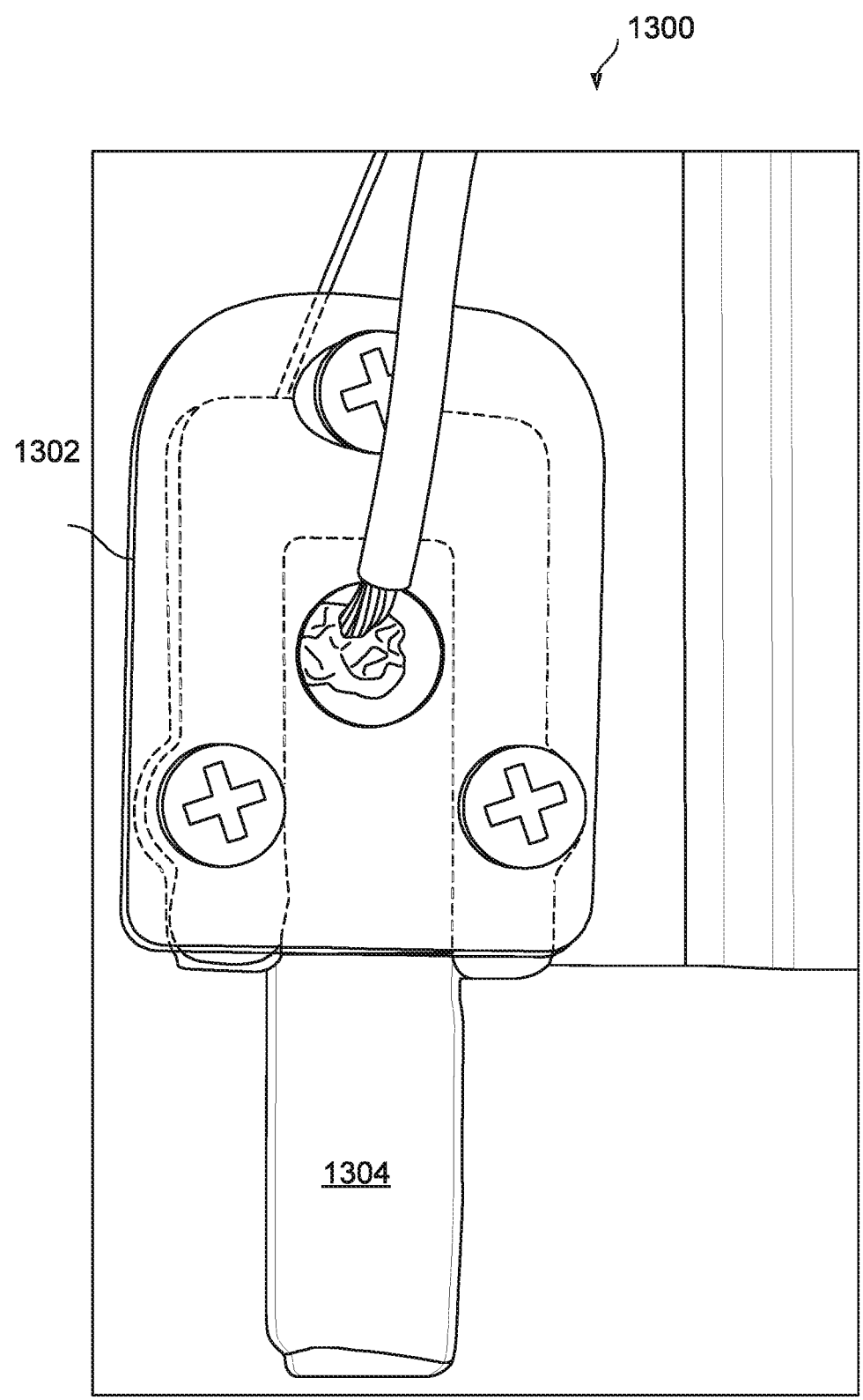
FIG. 13 is an exemplary block diagram illustrating a shelf support arm including a mounting plug.

Referring again to FIG. 13, an exemplary block diagram illustrating a shelf support arm 1300 including a mounting plug 1302 is shown. The mounting plug 1302 is attached to an end of the shelf support arm 1300. The tab 1304 on the mounting plug has a size and shape configured to fit within a mounting slot on the shelf support member.

Figure 14:
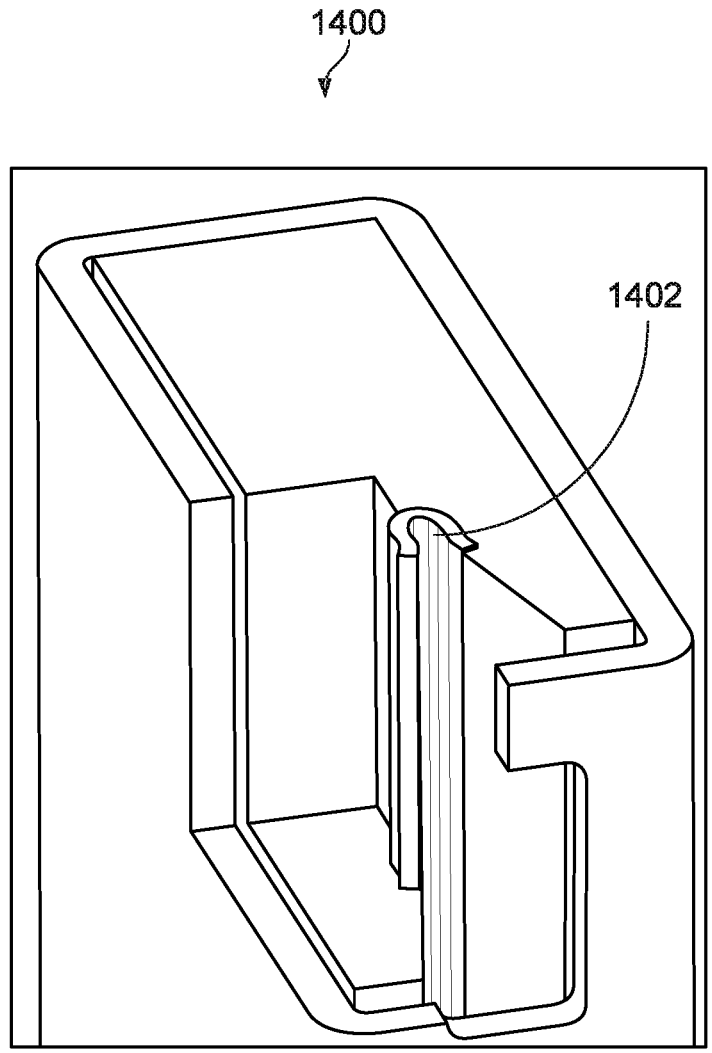
FIG. 14 is an exemplary block diagram illustrating a power bus surrounded by nonconducting insulation within a u-shaped channel.

FIG. 14 is an exemplary block diagram illustrating a power bus within a shelf support member 1400 surrounded by nonconducting insulation within a u-shaped channel 1402. In this example, the power delivery bar is a trough shape instead of a cylinder shape as shown in FIG. 9, FIG. 10, and FIG. 11 above. The copper conductor is a u-shaped channel to improve reliability and reduce wear on the insulation. In some examples, the nonconducting insulation is plastic.

Figure 15:
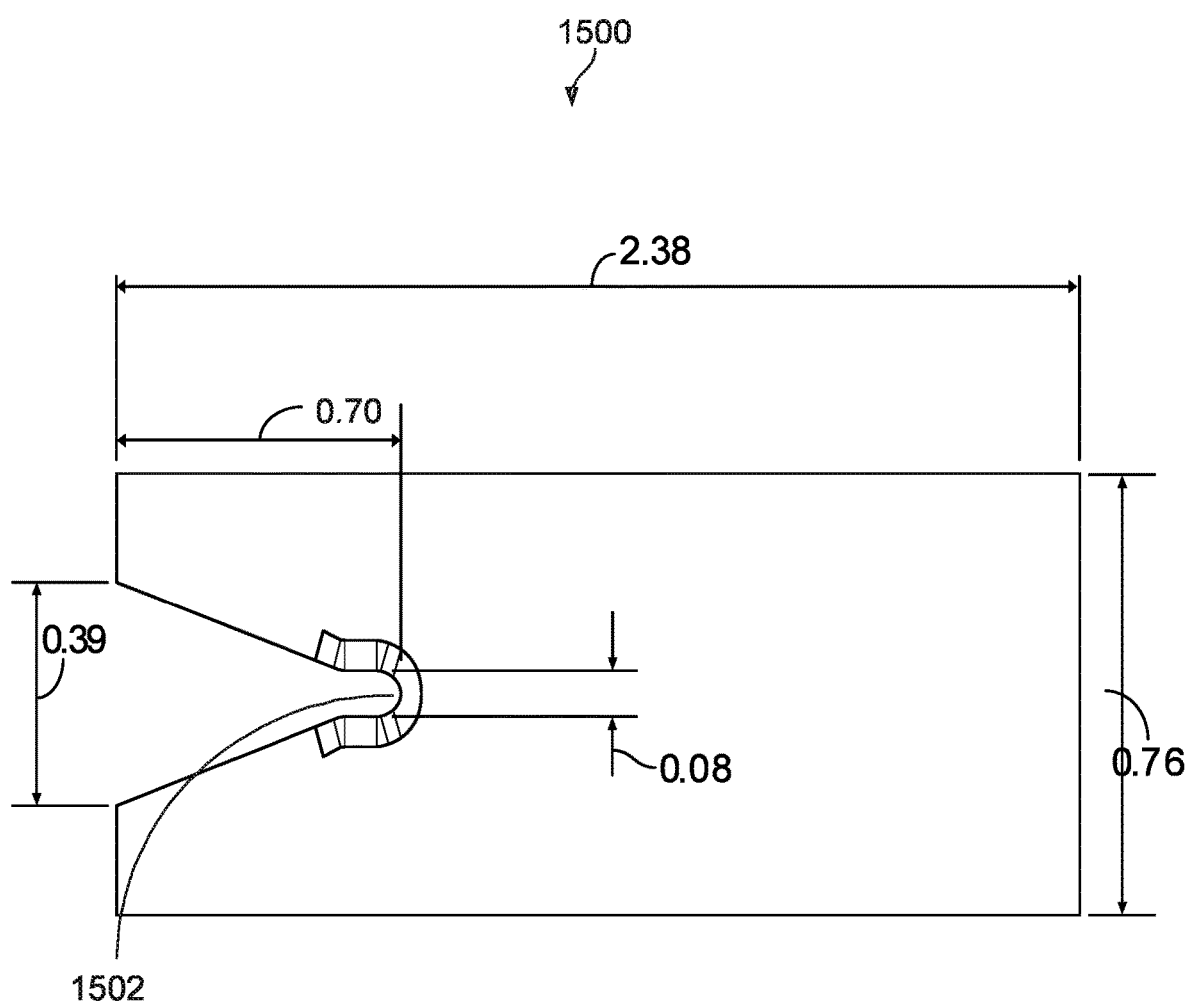
FIG. 15 is an exemplary block diagram illustrating a cross section of an interior of a shelf support member including a power bus within a u-shaped channel.

Turning now to FIG. 15, an exemplary block diagram illustrating a cross section of an interior of a shelf support member 1500 including a power bus within a u-shaped channel 1502 is shown. The power delivery bar in this example is a trough or u-shaped channel rather than a cylinder. The channel provides greater durability and accessibility.

Figure 16:
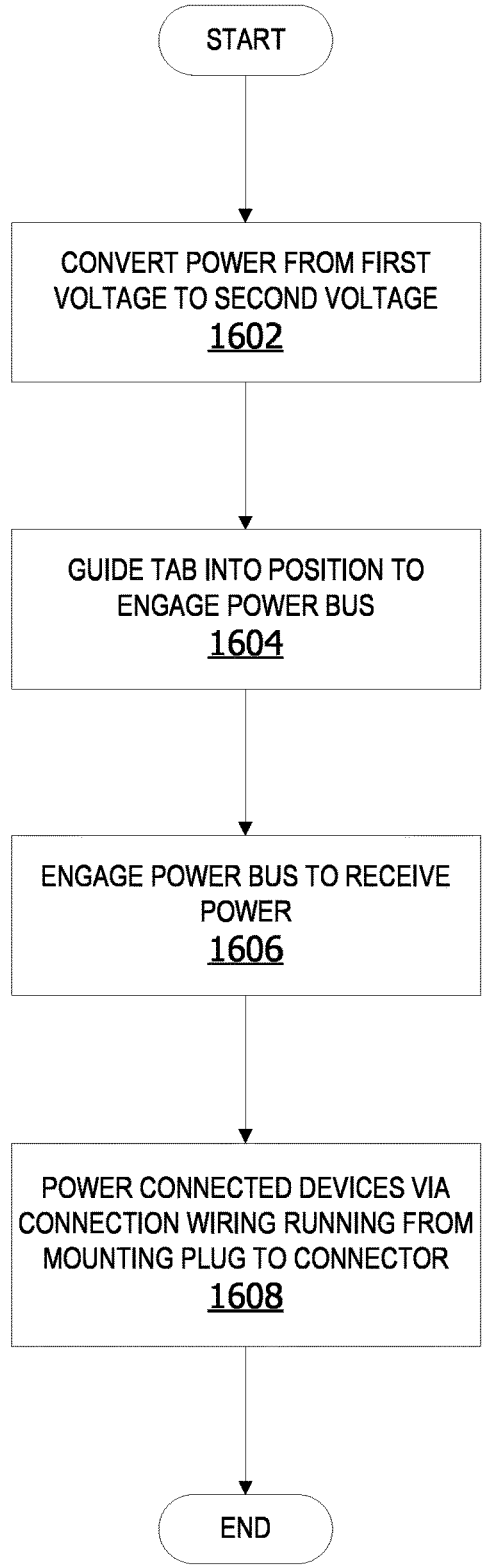
FIG. 16 is an exemplary flow chart illustrating a process for providing power to one or more peripheral devices via a power shelf.

FIG. 16 is an exemplary flow chart illustrating a process for providing power to one or more peripheral devices via a power shelf. The process begins by converting power from a first voltage to a second voltage at 1602. The power is converted by a converter, such as, but not limited to, the converter box 114 in FIG. 1. A tab on a mounting plug is guided into position to engage a power bus at 1604. The tab is guided by a guide, such as, but not limited to, a guide in the plurality of guides 112 in FIG. 1. A power bus is engaged by the tab to receive power at 1606. Connected peripheral devices are powered via connection wiring running from the mounting plug to the connector at 1608. The process terminates thereafter.

Additional Examples

In some examples, the system includes a set of shelf support members having a plurality of slots. A first shelf support member is mounted to a wall or other fixture and positioned parallel to a second shelf support member mounted to the same wall or fixture. A set of shelves are removably attached to the set of shelf support members. A first shelf in the set of shelves has a set of support arms. A support arm in the set of support arms includes a mounting bracket at one end of the support arm having a shape corresponding to at least one shelf support slot in the plurality of slots. The mounting bracket removably couples to the at least one shelf support slot. A power bus running vertically through a hollow cavity within the first shelf support member. The power bus receives an electrical power supply from a converter box. A nonconducting insulation within the first shelf support member at least partially surrounding the power bus. A mounting plug includes a power tab and a mounting member. The tab is sized to fit within a mounting slot on the first shelf support member to engage the power bus. The electrical power supply flows from the power bus through the power tab when engaged. A guide associated with the nonconducting insulation within the first shelf support member directs the plug into a position for engaging the power bus. A peripheral device connection wire is connected to a second end of the plug having a set of connectors that connect to at least one electrically powered peripheral device. The peripheral device connection wire at least partially embedded within an interior of the first shelf.

In other examples, the adjustable shelf system has an electrical plug incorporated into the shelf through which power is provided to electrical devices on the shelf. Two vertical rails support one or more horizontal power shelves. Power bus wiring runs through the hollow center of one of the vertical rails and engages with the plug on each shelf to provide power to each shelf.

The power shelf, in other examples, includes two attachment members. Each attachment member removably attaches to one of the vertical support rails. At least one of the attachment members includes the plug. The plug on the shelf includes a tab which slides into a slot on the vertical rail, engaging with the power bus inside the rail. Power flows from the power bus inside the rail, into the plug and through wiring in the shelf. The wiring in the shelf provides power to one or more shelf mounted peripherals, such as, but not limited to, LED lights on the shelf, electronic shelf labels, camera(s), and/or shelf edge displays.

The power shelf, in other examples, includes a mounting plug at the attachment point of a removable/adjustable shelf for receiving electrical power from the power bus. The power bus runs through the hollow central cavity of one of the vertical support rails. Insulation is provided within the hollow cavity surrounding the power bus wiring. A converter box connected to the power bus and incorporated within a top member of the shelf to convert voltage from 110 down to 12 V. The converter box connects to an exterior 110/220 power supply.

In still other examples, the mounting plug includes a tab which inserts into a slot on the vertical support rail. The tab receives electrical power from the power bus. The tab is shaped to fit the slot/aperture on the rail. The tab is made of a conductive material. A wire connects the plug to one or more peripheral devices. The wire attaches to a main body of the plug and runs through the shelf to an exit point (aperture) at which the wire can be connected to a peripheral device. A rubber (elastic) padding within/around a portion of the plug (inside the housing) stabilizes the plug. The rubber padding provides shock absorption and permits the plug to flex/wiggle without damage to the plug tab. The plug may also include a ground wire and non-conductive housing.

In an example scenario, power received from an external power source is converted to 12V DC by a converter. A power bus runs full length of shelf vertical sections and is fed power from the converter box above. The power bus is separated from the shelf frame by a non-conductive housing. The housing also serves a guide for the plug to ensure good electrical connection. The power is fed to the shelves through a power bus that runs through the inside of the shelf vertical. Each shelf is equipped with a plug mechanism that contacts the power bus when the shelf is installed. The plug is comprised of a copper conductor which is installed in a flexible mount to allow for small amounts of misalignment and movement. Power is carried to peripherals by wiring installed under the shelf. The power supply can be equipped with overcurrent detection, fault alerting, and remote shutoff which will reduce the risks from electrical shorts and other hazardous conditions. Each exposed electrical component is enclosed in insulative material to prevent shorts and reduce the possibility of electric shock. Each shelf is equipped with a plug that engages the power bus and distributes power to mounted equipment. This permits resetting shelves without disconnection of wires as each shelf can be easily moved while avoiding damage and reducing time required to remove and reinstall the shelves.

In another example, the mounting plug and connection wiring on the shelves distribute power to devices, such as, but not limited to, shelf edge displays. The shelf frame acts as ground for system eliminating the need for a specialized ground terminal. The shelf design can be easily altered to accommodate different shelf form factors.

In other examples, a rubber buffer associated with the mounting plug enables the plug and/or tab to flex during mounting and dismounting of the shelf. The rubber buffer enables the plug to move if/when the shelf moves without breaking or bending the tab. If the shelf is bumped or moved, the rubber buffer permits the mounting plug to flex with the movement, enabling the tab to maintain connection with the power bus.

In still other examples, the connection wire and connectors are hidden behind or within the shelf. The wire only exits the shelf where it is needed to connect to a peripheral device. This enables the wiring to remain hidden for improved appearance of the shelf as well as prevention of damage to the wiring.

In yet another example, each exposed electrical component is enclosed in insulative material to prevent shorts and reduce the possibility of electric shock. The shelf frame acts as ground for system eliminating the need for a specialized ground terminal.

The power shelf is modular and easily removed/adjusted without detaching wires or removing wiring from the shelves. The shelf can be attached to any of a plurality of slots on the vertical rail and still receive electrical power. The wiring runs through the vertical support railing and shelf such that wires are not visible to users.

Alternatively, or in addition to the other examples described herein, examples include any combination of the following:

- a second shelf associated with the converter box located at the highest position in the set of shelves;
- a drop-down electrical cord providing electrical power to the converter box, wherein the drop-down electrical cord descends from a location above the set of shelves;
- the guide forms a funnel-shaped space within the nonconducting insulation which guides and supports the tab into position to engage the power bus during mounting of a shelf;
- an aperture within a body of the first shelf, wherein an electrical connection point in the set of peripheral device connectors associated with the peripheral device connection wire exits the interior of the first shelf at the aperture;
- an electronic shelf label connected to a peripheral device connector in the set of connectors associated with the peripheral device connection wire;
- electrical power flows through the power bus from the converter box and into the electronic shelf label via the peripheral device connection wire attached to the plug of the first shelf engaging the power bus;
- a camera connected to a peripheral device connector in the set of connectors associated with the peripheral device connection wire, wherein electrical power flows through the power bus from the converter box and into the camera via the peripheral device connection wire attached to the plug of the first shelf engaging the power bus;
- converting, by a converter box, electrical power from a first voltage to a lower second voltage, the converter box associated with a topmost shelf in a set of shelves;
- guiding, by a guide, a tab associated with a plug on a shelf support arm of a selected shelf within the set of shelves into a slot within a vertical shelf support member;
- the guide associated with a nonconducting insulation within the vertical shelf support member;
- engaging, by the tab, a power bus running vertically through a hollow cavity within the vertical shelf support member, the power bus receiving the electrical power having the second voltage from the converter box;
- powering at least one peripheral device connected to at least one connection wire associated with a second end of the plug, the peripheral device connection wire at least partially embedded within an interior of the selected shelf;
- the peripheral device connection wire having a set of connectors configured to connect to a plurality of electrically powered peripheral devices associated with the selected shelf;
- providing the electrical power to the converter box via a drop-down electrical cord connected to an external power supply;
- the drop-down electrical cord descends from a location above the set of shelves;
- the guide is a funnel-shaped space within the nonconducting insulation proximate to the shelf support slot;
- connecting a plug associated with at least one peripheral device to an electrical connection point associated with the peripheral device connection wire exiting the interior of the selected shelf at an aperture within a body of the selected shelf;
- connecting the plurality of peripheral devices to the set of connectors associated with the peripheral device connection wire exiting the interior of the selected shelf at a plurality of apertures within the body of the selected shelf;
- providing electrical power to an electronic shelf label connected to a peripheral device connector in the set of connectors of the peripheral device connection wire;
- electrical power flows through the power bus from the converter box and into the electronic shelf label via the peripheral device connection wire attached to;
- providing electrical power to a camera connected to peripheral device connector in the set of connectors of the peripheral device connection wire;
- electrical power flows through the power bus from the converter box and into the camera via the peripheral device connection wire attached to the plug of the first shelf engaging the power bus;
- a power shelf mounting plug at a first end of the shelf support arm that removably attaches to a shelf support member in a set of shelf support members, the electrical plug comprising a main body;
- a power tab attached to a first end of the main body of the power shelf mounting plug, wherein the power tab is sized to slide along a guide formed within a nonconducting insulation corresponding to shelf support slot on the shelf support member, wherein the guide direct an end of the power tab into a position to engage a power bus within a central cavity of the shelf support member;
- a peripheral device connection wire connected to a second end of the main body of the power shelf mounting plug, the peripheral device connection wire at least partially embedded within an interior of the shelf, the peripheral device connection wire having a set of connectors configured to connect to at least one electrically powered peripheral device associated with the shelf;
- a drop-down electrical cord providing electrical power to a converter box, wherein the drop-down electrical cord descends from a location above the shelf;
- the converter box converts electrical power received from an exterior power source from a first voltage to a second lower voltage, wherein the converter box provides the electrical power at the second, lower voltage to the power bus for utilization by one or more peripheral devices; and
- an aperture within a body of the shelf, wherein a peripheral device connector in the set of connectors associated with the peripheral device connection wire exits the interior of the shelf at the aperture.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13, or an entity not shown in FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13.

While the aspects of the disclosure have been described in terms of various examples with their associated operations, a person skilled in the art would appreciate that a combination of operations from any number of different examples is also within scope of the aspects of the disclosure.

The examples illustrated and described herein as well as examples not specifically described herein but within the scope of aspects of the disclosure constitute exemplary means for providing electricity to peripheral devices associated with an adjustable power shelf system. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13, such as when encoded to perform the operations illustrated in FIG. 14, constitute exemplary means for converting electrical power from a first voltage to a lower second voltage, the converter box associated with a topmost shelf in a set of shelves; exemplary means for guiding a tab associated with a plug on a shelf support arm of a selected shelf within the set of shelves into a slot within a vertical shelf support member, the guide associated with a nonconducting insulation within the vertical shelf support member; exemplary means for engaging a power bus running vertically through a hollow cavity within the vertical shelf support member, the power bus receiving the electrical power having the second voltage from the converter box; and exemplary means for providing power to at least one peripheral device connected to at least one connection wire associated with a second end of the plug, the peripheral device connection wire at least partially embedded within an interior of the selected shelf, the peripheral device connection wire having a set of connectors configured to connect to a plurality of electrically powered peripheral devices associated with the selected shelf.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of," or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An adjustable power shelf system comprising:
a set of shelf support members having a plurality of slots, a first shelf support member positioned parallel to a second shelf support member;
a set of shelves removably attached to the set of shelf support members, a first shelf in the set of shelves having a set of support arms, a support arm in the set of support arms comprising a mounting bracket at one end of the support arm having a shape corresponding to at least one shelf support slot in the plurality of slots, wherein the mounting bracket removably couples to the at least one shelf support slot;
a power bus running vertically through a hollow cavity within the first shelf support member, the power bus receives an electrical power supply from a converter box;
a nonconducting insulation within the first shelf support member at least partially surrounding the power bus;
a plug having a tab connected to a first end of the plug, the tab coupled to the mounting bracket of the support arm, the tab sized to fit within a support slot on the first shelf support member to engage the power bus, wherein the electrical power supply flows from the power bus through the tab when engaged;
a guide provided within a cavity of the first shelf support member, the guide providing a formation within the cavity that directs a portion of the plug into a position for engaging the power bus; and
a peripheral device connection wire connected to a second end of the plug having a set of connectors that connect to at least one electrically powered peripheral device, the peripheral device connection wire at least partially embedded within an interior of the first shelf.

2. The adjustable power shelf system of claim 1, further comprising:
a second shelf associated with the converter box located at a highest position in the set of shelves.

3. The adjustable power shelf system of claim 1, further comprising:
a drop-down electrical cord providing electrical power to the converter box, wherein the drop-down electrical cord descends from a location above the set of shelves.

4. The adjustable power shelf system of claim 1, wherein the guide forms a funnel-shaped space within the nonconducting insulation which guides and supports the tab into position to engage the power bus during mounting of a shelf.

5. The adjustable power shelf system of claim 1, further comprising:
an aperture within a main body of the first shelf, wherein an electrical connection point in the set of connectors associated with the peripheral device connection wire exits the interior of the first shelf at the aperture.

6. The adjustable power shelf system of claim 1, further comprising:
an electronic shelf label connected to a peripheral device connector in the set of connectors associated with the peripheral device connection wire, wherein electrical power flows through the power bus from the converter box and into the electronic shelf label via the peripheral device connection wire attached to the plug of the first shelf engaging the power bus.

7. The adjustable power shelf system of claim 1, further comprising:
a camera connected to a peripheral device connector in the set of connectors associated with the peripheral device connection wire, wherein electrical power flows through the power bus from the converter box and into the camera via the peripheral device connection wire attached to the plug of the first shelf engaging the power bus.

8. A method for providing power to a plurality of peripheral devices associated with a power shelf system, the method comprising:
converting, by a converter box, electrical power from a first voltage to a lower second voltage, the converter box associated with a topmost shelf in a set of shelves;
guiding, by a guide, a tab associated with a plug on a shelf support arm of a selected shelf within the set of shelves into a slot within a vertical shelf support member, the guide implemented within a hollow cavity of the vertical shelf support member and providing a formation within the cavity that directs the tab into a position for engaging a power bus;
engaging, by the tab, the power bus running vertically through a hollow cavity within the vertical shelf support member, the power bus receiving the electrical power having the second voltage from the converter box; and
powering at least one peripheral device connected to at least one connection wire associated with a second end of the plug, a peripheral device connection wire at least partially embedded within an interior of the selected shelf, the peripheral device connection wire having a set of connectors configured to connect to a plurality of electrically powered peripheral devices associated with the selected shelf.

9. The method of claim 8, further comprising:
providing the electrical power to the converter box via a drop-down electrical cord connected to an external power supply, wherein the drop-down electrical cord descends from a location above the set of shelves.

10. The method of claim 8, wherein the guide is a funnel-shaped space within the nonconducting insulation, the guide located proximate to a shelf support slot.

11. The method of claim 8, further comprising:
connecting a plug associated with at least one peripheral device to an electrical connection point associated with the peripheral device connection wire exiting the interior of the selected shelf at an aperture within a main body of the selected shelf.

12. The method of claim 8, further comprising:
connecting the plurality of peripheral devices to the set of connectors associated with the peripheral device connection wire exiting the interior of the selected shelf at a plurality of apertures within a main body of the selected shelf.

13. The method of claim 8, further comprising:
providing electrical power to an electronic shelf label connected to a peripheral device connector in the set of connectors of the peripheral device connection wire, wherein electrical power flows through the power bus from the converter box and into the electronic shelf label via the peripheral device connection wire attached to the plug engaging the power bus.

14. The method of claim 8, further comprising:
providing electrical power to a camera connected to a peripheral device connector in the set of connectors of the peripheral device connection wire, wherein electrical power flows through the power bus from the converter box and into the camera via the peripheral device connection wire attached to the plug engaging the power bus.

15. An adjustable power shelf comprising:
a shelf support arm associated with a shelf;
a power shelf mounting plug at a first end of the shelf support arm that removably attaches to a shelf support member in a set of shelf support members, the mounting plug comprising a main body;
a tab attached to a first end of the main body of the power shelf mounting plug, wherein the tab is sized to slide along a guide formed within a nonconducting insulation corresponding to a shelf support slot on the shelf support member, wherein the guide is configured to direct an end of the tab into a position to engage a power bus within a central cavity of the shelf support member by providing a formation within the central cavity that corrects the position of the tab as it enters the shelf support slot to enable proper engagement with the power bus; and
a peripheral device connection wire connected to a second end of the main body of the power shelf mounting plug, the peripheral device connection wire at least partially embedded within an interior of the shelf, the peripheral device connection wire having a set of connectors configured to connect to at least one electrically powered peripheral device associated with the shelf.

16. The adjustable power shelf of claim 15, further comprising:
a drop-down electrical cord providing electrical power to a converter box, wherein the drop-down electrical cord descends from a location above the shelf; and
the converter box converts electrical power received from an exterior power source from a first voltage to a second lower voltage, wherein the converter box provides the electrical power at the second, lower voltage to the power bus for utilization by one or more peripheral devices.

17. The adjustable power shelf of claim 15, further comprising:
a u-shaped channel within the shelf support member including the power bus.

18. The adjustable power shelf of claim 15, further comprising:
an aperture within a body of the shelf, wherein a peripheral device connector in the set of connectors associated with the peripheral device connection wire exits the interior of the shelf at the aperture.

19. The adjustable power shelf of claim 15, further comprising:
an electronic shelf label connected to a peripheral device connector in the set of connectors of the peripheral device connection wire, wherein electrical power flows through the power bus from a converter box and into the electronic shelf label via the peripheral device connection wire attached to the plug engaging the power bus.

20. The adjustable power shelf of claim 15, further comprising:
a camera connected to a peripheral device connector in the set of connectors of the peripheral device connection wire, wherein electrical power flows through the power bus from a converter box and into the camera via the peripheral device connection wire attached to the plug engaging the power bus.

* * * * *